Patented Mar. 27, 1951

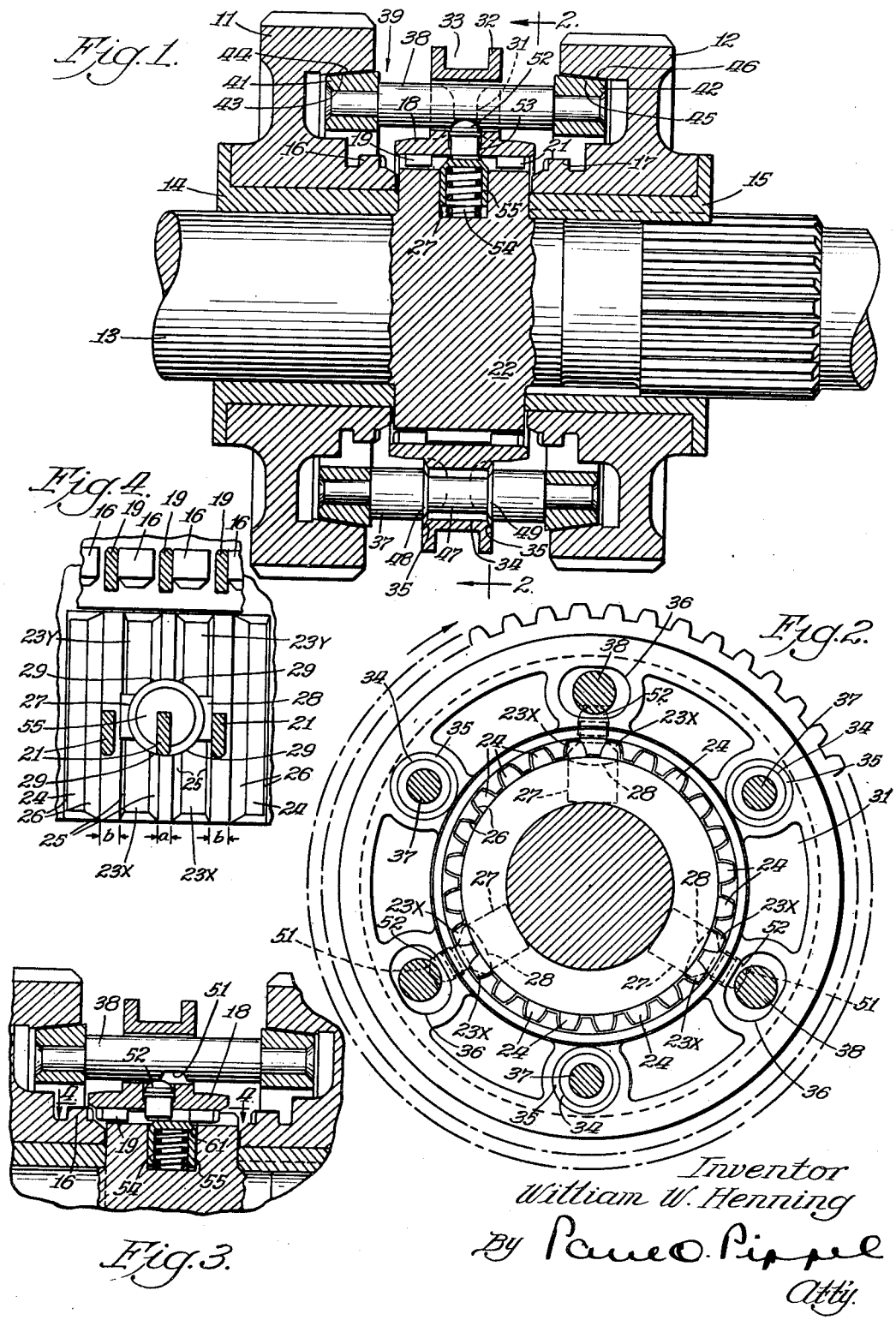

2,546,746

UNITED STATES PATENT OFFICE 2,546,746

SYNCHRONIZER CLUTCH

William W. Henning, Riverside, Ill., assignor to International Harvester Company, a corporation of New Jersey Application November 18, 1946, Serial No. 710,477

13 Claims. (Cl. 192—53)

This invention concerns means for selectively connecting or disconnecting rotatable parts of a power train as are present in a change-speed transmission, and more particularly relates to means for preventing accidental disruption of the connection and to a decapacitating control for a synchronizer employed between certain of said parts.

An object of the invention is the provision in means for selectively establishing or disestablishing a driving connection between rotatable power train parts, of toothed members so constructed and arranged that one has first and second sets of teeth mated with certain teeth of a set on the other member and successively cooperable with the teeth mated therewith to prevent relative rotation between such members pursuant to axial shifting of such member from a neutral position wherein the driving connection is disestablished to an operative position wherein the driving connection is established, the pressure faces of the first set of teeth and those mated therewith being meshed while the shiftable member is in neutral and being sufficiently short to be carried out of circumferential registry pursuant to the shifting into said operative position where the second set of teeth and those mated therewith are meshed, and the backlash between the second set of teeth and those mated therewith while the shiftable member is in the operative position exceeding that between the pressure faces of the first set of teeth and the teeth mated therewith whereby portions of the first set of teeth and those mated therewith are disposable in registry axially of said members to prevent accidental retractive shifting of the shiftable member from the operative position.

Another object is the provision of a novel control for the detent means of a synchronizer clutch and operable to remove spring pressure upon the detent plunger following an initial portion of the movement of the shiftable member from the neutral position so that virtually all pressure between the friction surfaces of the synchronizer clutch is eliminated to facilitate slight relative rotation of the synchronized members as the one is shifted into the operative position.

Still another object is the provision of means for selectively establishing or disestablishing a driving connection between rotatable power train parts as stated in the first object above together with a synchronizer including a recess for a detent means spring, and such recess being formed in the one toothed member in such a position as to cause removal of portions of the first set of teeth referred to in the first object above and thereby limiting the length of the pressure faces of said teeth so that these teeth and those of the shiftable member mated therewith are carried out of circumferential registry when the shiftable member is shifted into an operative position.

The above objects and more specific objects and advantages will be better understood upon reading the ensuing description with reference to the drawings, wherein:

Fig. 1 is a sectional view taken upon a plane centrally and axially intersecting relatively rotatable parts of a change-speed transmission gearing and means embodying a preferred form of the invention for selectively connecting one of these parts with either of two other parts.

Fig. 2 is a transverse sectional view taken through the apparatus at positions indicated by the offset line 2—2 in Fig. 1.

Fig. 3 is a fragmentary sectional view showing the detent means of Fig. 1 and parts associated therewith in an intermediate stage of operation which occurs during shifting of the shiftable member from its neutral position toward an operative position wherein the left-most gear will be connected for rotation with the shaft upon which it is rotatively mounted.

Fig. 4 is a fragmentary view taken on the line 4—4 of Fig. 3 but illustrating the teeth of the shiftable member in the position occupied when such member is fully shifted into the operative position for connecting said left-most gear with said shaft.

The invention is illustrated by showing a preferred embodiment thereof in a typical installation. This embodiment of the invention is employed with means for selectively interconnecting gears 11 and 12, Fig. 1, for rotation with a rotatable support or body constituted by a shaft 13 upon which the gears are journalled. Bushings 14 and 15 are disposed between the hubs of said gears and said shaft. These gears 11 and 12 have circumferential rows of clutch teeth 16 and 17 respectively thereon. The gear 11 with its jaw clutch teeth 16 and an axially shiftable member 18, which is constrained for rotation with the shaft 13, constitute rotatable companion structures inasmuch as the member 18 has an internal row of circumferentially spaced teeth 19 which are meshable with the teeth 16 when the member 18 is axially shifted to the left as viewed in Fig. 1. Likewise, the gear 12 together with its jaw clutch teeth 17 and the member 18 constitute rotatable companion structures since a row of internal circumferentially spaced teeth 21 on the member 18 are meshable with the teeth 17 when said member is shifted to the right as viewed in Fig. 1.

The shiftable member 18 is shown in a neutral position in Fig. 1. When this member is shifted to the left for sliding the teeth 19 into mesh with the teeth 16, said member occupies an operative position wherein it is effective for constraining the gear 11 for rotation with the shaft 13. When the member 18 is shifted from the neutral position for placing the teeth 21 enmeshed with the teeth 17 it occupies a second operative position wherein it is effective for constraining the gear 12 for rotation with the shaft 13.

To facilitate understanding of the power transmitting parts illustrated in the drawings, it can be assumed that the shaft 13 is an engine-driven shaft of a change-speed transmission and that the gears 11 and 12 are connected by other gearing (not shown) to means for driving vehicle propelling means such as road wheels. Consequently when the clutch teeth 19 and 16 are meshed, a power train will be established in a power transmitting condition for transmitting power from the engine to the propelling means, and when the clutch teeth 21 and 17 are meshed another power train will be established in a power transmitting condition for driving the propelling means in the opposite direction or at a different speed than that at which it is driven through the gear 11.

A portion 22 of the shaft between the gears 11 and 12 is relatively large in diameter and has several sets of teeth spaced circumferentially about its cylindrical periphery. A row of teeth extending about the right end of the circumferential periphery of the shaft enlargement 22 embodies three sets of circumferentially spaced teeth 23X, there being two teeth in each set and these sets being spaced apart 120° as illustrated in Fig. 2. Three sets of teeth 24 extend from end to end of the shaft enlargement 22. There are six teeth 24 in each of the three sets of these teeth.

The teeth 23X in each set have opposed pressure faces 25 which are circumferentially spaced a distance $a$ as illustrated in Fig. 4. The opposite pressure faces 25 of the pairs of teeth 23X are spaced circumferentially a distance $b$ from pressure faces 26 of the teeth 24 next adjacent thereto, and this circumferential spacing $b$ is the same as the circumferential spacing between the opposed pressure faces of the teeth 24 within the sets of such teeth 24. In Fig. 4 it can be observed that the distance $b$ exceeds the distance $a$.

An additional three sets of circumferentially spaced teeth 23Y are formed on the shaft enlargement 22 near its left end as viewed in Fig. 1 and the teeth in these sets are respectively axially aligned with the teeth 23X of the first mentioned three sets as illustrated with respect to two of the aligned sets in Fig. 4. In fact, the axially aligned teeth 23X and 23Y are initially formed as a single tooth and are subsequently spaced pursuant to the drilling of recesses 27 and the effecting of slashing cuts 28 by means of a milling wheel which is of sufficiently short radius that the cutting periphery of such wheel fails to contact the teeth 24 next adjacent to the teeth 23X and 23Y. In Fig. 4 it can be seen that the drilling of a recess 27 causes the formation of shoulders 29 at the adjacent ends of the associated pressure faces 25 of the teeth 23X and 23Y.

In Fig. 2 it can be seen that the circumferential row of teeth 21 on the shiftable member 18 are of equal breadth and are equally spaced, this breadth and spacing of said teeth being such that the ones thereof meshing with or disposed between the pairs of teeth 23X have virtually no backlash. However, since the spacing $b$ of the teeth 24 exceeds the spacing $a$ of the teeth 23X, considerable backlash prevails between the teeth 24 and the teeth 21 so that while the shiftable member 18 is in the neutral position the sets of teeth 23X will maintain the teeth 21 out of contact with the pressure faces of the teeth 24 mated therewith. The same condition prevails between the shiftable member teeth 19, the pairs of closely spaced teeth 23Y, and the teeth 24 while the shiftable member is in neutral.

The shiftable member 18 has a radial web 31 which carries a rim 32 in which there is a shifter fork groove 33. Said web 31 has three blocker holes 34 extending axially of the member and spaced 120° apart about its axis. Each of these blocker holes 34 has inclined blocker shoulders 35 at its two ends. There are also three elongated holes 36 in the shiftable member web 31 and these holes are also spaced apart 120° and formed between the blocker holes 34 as illustrated in Fig. 2. These holes 34 and 36 respectively receive axially extending pins 37 and 38 of a synchronizer clutch element or member 39. These pins 37 and 38 have reduced end portions anchored in friction clutch rings 41 and 42, the ring 41 having a conical friction surface 43 complemental to a friction surface 44 on the gear 11, and the ring 42 having a conical friction surface 45 complemental to a friction surface 46 on the gear 12.

Reduced central portions 47 of the pins 37 form blocking shoulders 48 and 49 which are respectively registrable axially of the synchronizer cage or element 39 with their associated shoulders 35 on the web 31 incident to a slight relative rotation between said cage and the shiftable member 18. There is sufficient clearance between said reduced pin portions 47 and the holes receiving them and between the pins 38 and the elongated holes 36 to permit this slight relative rotation between the parts 39 and 18.

Each of the synchronizer cage pins 38 contains a notch 51 which constitutes a detent means component cooperable with a plunger component 52. Said plungers 52 are carried by the shiftable member 18 in radial bores 53 wherein these plungers are slidable radially of said shiftable member. Expansion springs 54 in the shaft enlargement recesses 27 react against the inner ends of the plungers 52 through spring caps 55 which are slidable radially within the recess 27. When the shiftable member 18 is in neutral as illustrated in Fig. 1 the springs 54 are effective for pressing the spring caps 55 into abutment with the inner ends of the detent plungers 52 and thereby yieldably forcing these plungers into the notches 51 therefor.

*Opration of the apparatus*

Assuming that the shiftable member 18 is in the neutral position illustrated in Fig. 1, that the shaft 13 and the gear 11 are rotating clockwise as viewed from the right end in Fig. 1 and as viewed in Fig. 2, but that the shaft 13 and the parts constrained for rotation therewith are rotating at greater speed than said gear 11 and that the member 18 is being shifted toward the gear 11 for meshing the clutch teeth 19 and 16, such endwise movement of the member 18 will carry the detent plungers 52 therewith while sliding the inner ends of these plungers upon the outer ends of their associated spring caps 55. Since the plungers 52 are within the notches 51, the synchronizer cage 39 will be initially shifted with the member 18 and will thus cause the friction face 43 to engage the friction face 44 on the gear 11. This will limit axial shifting of the synchronizer cage, and, because of the frictional engagement between surfaces 43 and 44, the more slowly rotating gear 11 will impart a counterclockwise rotation to the synchronizer cage relatively to the shiftable member 18 and thereby bring the blocking shoulders 49 against the shoulders 35 complemental therewith so that further shifting of the member 18 will be precluded until synchronization of the gear 11 and the shaft 13 occurs.

During this blocking action of the shoulders 35 and 49 the shiftable member 18 will be in the position illustrated in Fig. 3 where the detent members 52 will have been cammed out of their notches 51. Jaw clutch teeth 19 will be held out of reach of the teeth 16 by the blocker shoulders. Ultimately the engine-driven shaft 13 will slow down to the speed of the gear 11 and in crossing the speed of the gear 11, while still decelerating, the shiftable member 18 will withdraw its blocking shoulders 35 out of axial registry with the blocking shoulders 48 of the synchronizer cage pins whereby the member 18 may be shifted for meshing teeth 19 and 16 while they are rotating at virtually the same speed.

As the shiftable member 18 is shifted leftward from the position illustrated in Fig. 3 into the position for meshing the teeth 19 and 16 as illustrated in Fig. 4, the three teeth 21 respectively mated with the sets of 23X, will effect a camming action on shoulders 61 of the spring caps 53 respectively associated therewith whereby the springs 54 are compressed and nullified in their action upon the detent plungers 52. Consequently, as the member 18 is shifted from the position of momentary pause caused by the blocking shoulders to the operative position of Fig. 4, the detent plungers 52 will impinge with no force from their springs 54 against the cage pins 38 and will not, therefore, cause any significant component of force to press the synchronizing clutch faces 43 and 44 together.

This operating characteristic of withdrawing the force of the detent springs 54 from the detent plungers during the final stage of moving the teeth 19 toward the teeth 16 is one of the features of this invention and has particular utility incident to a shift from the neutral to either of the operative positions while all parts are rotatively at rest. Normally there will be sufficient backlash in power trains including gears (not shown) meshed with the gears 11 and 12 to enable the blocking shoulders 48 and 49 and the inclined shoulders 35 complemental therewith to effect sufficient relative rotation between the gear 11, for example, and the shaft 13 to enable the shoulders to slip past one another and thereby allow the teeth 19, for example, to approach the teeth 16. If at this time the teeth 19 and 16 are out of registry so that they slide directly into mesh it would make no difference whether the friction clutch surfaces 43 and 44 were being pressed together. If, however, at this time the teeth 19 were in slight axial registry with the teeth 16 so that to bring the teeth 19 into registry with the spaces between the teeth 16 it would be necessary for relative rotation between the shiftable member 18 and the gear 11 in a direction precluded by abutment of the sides of holes 34 with their cage pins 37 which are frictionally held to the gear 11, the ends of the teeth 19 would simply abut against the ends of the teeth 16 and fail to mesh. In other words, if the detent plungers 52 are allowed to be pressed against the cage pins 38 during the final step of moving the teeth 19 toward the teeth 16, sufficient frictional drag will occur between said plungers and the cage to incur a substantial frictional engagement of the clutch surfaces 43 and 44 so that camming action between the chamfered ends of the teeth 19 and 16 does not develop enough force to cause relative rotation between these clutch surfaces. This difficulty is overcome by disposing the spring caps 55 in registry with certain of the trailing set of teeth 21 so that these caps and the springs 54 will be cammed into the recesses 27 out of effective engagement with the detent plungers 52. With the detent plungers relieved of spring pressure, the friction faces 43 and 44 can be moved relatively to one another by the camming action of the chamfered ends of the teeth 19 and 16 so that no difficulty is incurred when attempting to shift the shiftable member 18 from the neutral to the operative position for establishing the power train including the gear 11 when all parts are at rest. Since the structure is symmetrical the operation is identical when the member 18 is shifted to the right for connecting the gear 12 with the shaft 13.

Another feature of the invention is illustrated in Fig. 4 where it can be seen that the recesses 27 in the shaft enlargement 22 form shoulders 29 at the ends of the opposed pressure faces of the teeth 23X and 23Y. The recesses 27 therefore shorten or limit the length of the opposed tooth pressure faces 25 so that the teeth 21 slidable between these pressure faces and therefore mated therewith are free to move circumferentially with respect to the teeth 23X as permitted by the greater backlash between the teeth 24 and teeth 21 mated therewith when the member 18 is shifted axially into the operative position illustrated in Fig. 4. As a consequence of this relative rotative movement between the member 18 and the shaft enlargement 22, portions of the teeth 23X adjacently to the ends of their pressure faces where the shoulders 29 are formed are axially aligned with portions of the teeth 21 mated with such teeth 23X whereby accidental retractive shifting of the shiftable member 18 is avoided. The direction of torque transmittal through the device determines the direction of relative rotative movement, limited by the teeth 24 and 21, and also determines which of the teeth in the sets of teeth 23X have their end portions axially aligned with portions of the teeth 21 mated therewith.

A specific ilustration of axial registration of teeth 21 and 23X for preventing retractive shifting of the shiftable member 18 has been given with reference to Fig. 4 where the intended function of these teeth is illustrated. However, a similar cooperation occurs between the teeth 23Y and the teeth 19 mated therewith when the member 18 is shifted in the opposite direction for establishing the power train including the gear 12.

Replacement of the shiftable member 18 to neutral is done, as usual in the disengagement of jaw clutches, while no torque is being transmitted through the clutch 16-19 or 17-21 which happens to be engaged. Assuming the clutch 16-19 to be engaged as illustrated in Fig. 4, while no power is being transmitted through the power train including this clutch, there will be no substantial pressure between the pressure faces of its teeth, and since the power train is then relaxed and possesses the customary blacklash, the teeth 16 and 19 are easily demeshed and the beveled ends of the teeth 21 can cam against the ends of the teeth 23X adjacent thereto for guiding the teeth 21 into mesh with the teeth 23X.

Having thus described a single preferred embodiment of the invention with the view of clearly and concisely illustrating the same, I claim:

1. In a power transmitting train, rotatable companion structures of which one is axially movable selectively between a drive establishing position wherein a power transmitting relation exists between said structures and an inoperative position wherein said power transmitting relation is terminated, a support for the one structure and rotatable co-axially therewith, said one structure being axially moved relatively to said support incident to movement between said positions, rows of meshed circumferentially spaced teeth respectively upon said movable structure and said support, the circumferential spacing between complemental faces of certain of the meshed teeth being less than that between the other thereof to maintain said other of meshed teeth circumferentially separated while said movable structure occupies the inoperative position, an axially moveable synchronizer element coaxial with the axially moveable structure, a friction face on the other structure and frictionally engageable by the moveable element for synchronizing said structures, detent means for causing movement of the moveable element into said synchronizing frictional engagement with said friction face pursuant to movement of the moveable structure toward the other of said structures, there being a recess in said mounting and communicating with the surface thereof by passing through said certain teeth thereof and thereby limiting the axial length of said complemental faces thereon, said detent means comprising a spring-urged member retractable into said recess to disrupt the faculty of said detent means urging the synchronizer element to move axially with said moveable structure, said complemental teeth faces being carried out of circumferential registering pursuant to movement of said moveable structure into the drive establishing position, said other of said meshed teeth having faces exposed in circumferential registry while the moveable structure is in said drive establishing position, to limit circumferential movement of said structure on said mounting and to facilitate said certain teeth in one row to axially overlap those in the other row for preventing accidental retraction of the structure from the drive establishing position, and means on said moveable structure for retracting said spring-urged member into said recess during continued movement of said moveable structure toward the drive establishing position subsequent to frictional engagement of the synchronizing element with said friction face.

2. In a power transmitting train, rotatable companion structures of which one is axially moveable selectively between a drive establishing position wherein a power transmitting relation exists between said structures and an inoperative position wherein said power transmitting relation is terminated, a support for the one structure and rotatable coaxially therewith, said one structure being axially moved relatively to said support incident to movement betwen said positions, rows of meshed circumferentially spaced teeth respectively upon said moveable structure and said support, the teeth in each row having pressure faces which are complemental to such faces of the teeth meshed therewith, the circumferential spacing between complemental faces of certain of the meshed teeth being less than that between the other thereof to maintain said other of meshed teeth circumferentially separated while said moveable structure occupies the inoperative position, said complemental faces being of such limited length axially of the structure that they are carried out of circumferential registry pursuant to movement of said structure into said drive establishing position, and said other of said meshed teeth having faces disposed in circumferential registry while the moveable structure is in said drive establishing position, to limit circumferential movement of said structure on said mounting and to facilitate said certain teeth in one row axially overlapping those in the other row for preventing accidental retraction of the structure from the drive establishing position.

3. In a power transmitting train, a rotatable support having a set of circumferentially spaced teeth and also having a second set of circumferentially spaced teeth, a rotatable power transmitting member mounted on said support and axially shiftable thereon between an operative position wherein it is effective to cause establishment of said power train in a power transmitting condition and a neutral position wherein said power train is disestablished from said power transmitting condition, said shiftable power transmitting member having circumferentially spaced teeth of which part are meshed with said first set of teeth for constraining said member to rotate with said rotatable support while said member is in the neutral position, and part of the teeth of said shiftable power transmitting member meshing with said second set of teeth at least while said member is in the operative position and for constraining said member to rotate with said support, said first set of teeth and the teeth of said shifable member meshing therewith having side faces between which torsional force is transmitted between said support and said member and said side faces being of such limited length that they are carried out of circumferential registration pursuant to shifting of the member into the operative position, and there being greater backlash between said second set of teeth and the member teeth meshing therewith than between said first set of teeth and the member teeth meshing therewith whereby slight relative rotation can occur between said support and said member to dispose portions of the first set of teeth and portions of the member teeth at ends of said tooth faces in axial alignment while said member is in the operative position and for preventing accidental retractive shifting of said member toward the neutral position.

4. In a power transmitting train, a rotatable support having a set of circumferentially spaced teeth with opposed relatively closely spaced side faces and also having a second set of circumferentially spaced teeth with opposed side faces more widely spaced, a rotatable power transmitting member mounted on said support and axially shiftable thereon between an operative position wherein it is effective to cause establishment of said power train in a power transmitting condition and a neutral position wherein said power train is disestablished from said power transmitting condition, said axially shiftable member having circumferentially spaced teeth of which part mesh with said first set of teeth while said member is in the neutral position and of which part mesh with said second set of teeth at least while said member is in the operative position, the closely spaced side faces of said first set of teeth and the teeth of said shiftable member meshed therewith while the shiftable member is in the neutral position being sufficiently short axially of said member that such teeth are moved out of circumferential registration with said closely spaced tooth faces pursuant to shifting of the member into the operative position at which time the wider spacing of the side faces of the second set of teeth facilitate limited relative rotation of said support and member for disposal of end portions of the first set of teeth and of the member teeth meshable therewith in axial registration for preventing accidental retraction of the member toward the neutral position.

5. In a power transmitting train, a rotatable support having a group of circumferentially spaced sets of teeth of which the teeth in each set are also circumferentially spaced and have opposed relatively closely spaced side faces, said support having an additional group of circumferentially spaced sets of circumferentially spaced teeth having opposed side faces which are more widely spaced than the side faces in the first sets of teeth, said groups being arranged so their tooth sets alternate with one another in position circumferentially of said support, a rotatable power transmitting member shiftable axially on said support between an operative position wherein it is effective to cause establishment of said power train in power transmitting condition and a neutral position wherein the power train is disestablished from said power transmitting condition, said axially shiftable member having circumferentially spaced teeth of substantially uniform thickness circumferentially of said member and meshing with the sets of teeth on said support while said member is in the neutral position, the said circumferential thickness of the teeth on said shiftable member being substantially equal to the spacing between the opposed faces of the first sets of teeth on said support whereby the teeth on said shiftable member meshing with the teeth in the second sets on said support are maintained out of contact therewith while the shiftable member is in the neutral position, and the faces of the teeth in the first sets being sufficiently short that the teeth complemental thereto on the shiftable member are moved endwise out of circumferential registry therewith when the member is shifted into the operative position to facilitate abutment between the more widely spaced faces on the second sets of teeth and the shiftable member teeth complemental therewith pursuant to placing portions of the first sets of teeth and of the shiftable member teeth complemental therewith in axial registration when said member is shifted into the operative position.

6. In a power transmitting train, rotatable companion structures of which one is axially movable selectively between a neutral position wherein said structures are demeshed and a drive establishing position wherein toothed peripheries of said structures are meshed for establishing a driving relation therebetween, a rotatable support for the axially shiftable structure, a synchronizer clutch comprising complemental elements respectively constrained for rotation with said structures, the element which is constrained for rotation with the axially shiftable structure being axially shiftable therewith but also being mounted so relative axial movement is possible between such element and the shiftable structure, restrainable means operable when unrestrained to transmit force from said axially shiftable structure to said axially shiftable synchronizer clutch element to press such shiftable element into frictional engagement with its complemental element pursuant to an initial movement of the shiftable structure toward said other structure prior to continued movement of the shiftable structure into position to commence meshing with said other structure, and means operable by said shiftable structure pursuant to the continued movement thereof for restraining the restrainable means.

7. In a power transmitting train, a rotatable body, a rotatable power transmitting member constrained for rotation with said body but being axially shiftable relatively thereto between an operative position wherein it is effective to cause establishment of said power train in a power transmitting condition and a neutral position wherein said power train is disestablished from said power transmitting condition, a synchronizer clutch element shiftable axially with said axially shiftable member, said axially shiftable member and element also being relatively shiftable axially, detent means disposed between said member and said element and having the capability of transmitting a force axially of and to the element from the member during an initial portion of axial movement of said member from the neutral position toward the operative position, and means for decapacitating the force transmitting capability of said detent means during a succeeding portion of such axial movement of said member toward the operative position.

8. In a power transmitting train, a rotatable body, a rotatable power transmitting member constrained for rotation with said body but being axially shiftable relatively thereto between an operative position wherein it is effective to cause establishment of said power train in a power transmitting condition and a neutral position wherein said power train is disestablished from said power transmitting condition, a synchronizer clutch element shiftable axially with said axially shiftable member, said axially shiftable member and element also being relatively shiftable axially, detent means comprising components respectively carried by said clutch element and said shiftable member and means for yieldably pressing one of said components into complemental relation with the other wherein it is effective for urging said element to shift with said shiftable member during an initial portion of axial movement of said member from the neutral position toward the operative position, and means for nullifying the pressing function of said yieldably pressing means during a succeeding portion of such axial movement toward the operative position.

9. In a power transmitting train, a rotatable body, a rotatable power transmitting member constrained for rotation with said body but being axially shiftable relatively thereto between an operative position wherein said member is effective to cause establishment of said power train in a power transmitting condition and a neutral position wherein said power train is disestablished from said power transmitting condition, a synchronizer clutch member shiftable axially with said axially shiftable power transmitting member, said clutch member and said power transmitting member also being relatively axially shiftable, detent means comprising components respectively carried by said members and also comprising means yieldably urging one of said components into cooperable latching relation with the other while the power transmitting member is in the neutral position and to thereby cause axial shifting of said members in unison during an initial portion of axial movement of said power transmitting member from the neutral position toward the operative position, said components being displaceable from the cooperable relation during a succeeding portion of said axial movement, and means for withdrawing the force of said urging means from said detent means component during said succeeding portion of power transmitting member movement.

10. The combination set forth in claim 9 wherein said means for withdrawing force of said yieldably urging means comprises an element shiftable with said power transmitting member.

11. In a power transmitting train, a rotatable body, a rotatable power transmitting member constrained for rotation with said body but being axially shiftable relatively thereto between an operative position wherein said member is effective to cause establishment of said power train in a power transmitting condition and a neutral position wherein said power train is disestablished from said power transmitting condition, a synchronizer clutch member shiftable axially with said axially shiftable power transmitting member, said clutch member and said power transmitting member also being relatively axially shiftable, said shiftable power transmitting member having a radial bore therethrough and said body having a recess radially aligned with said bore, detent means comprising a notch component on said synchronizing clutch member in radial registration with said bore, a floating plunger component carried by said power transmitting member in said bore and spring means in said recess and impressing a force against said plunger component for urging the same into said notch component while the shiftable power transmitting member is in the neutral position, and means shiftable with said power transmitting member for compressing said spring out of force-impressing relation with said plunger component following at least partial deregistration of said detent components pursuant to shifting of said power transmitting member from said neutral position toward said operative position.

12. In a power transmitting apparatus comprising a plurality of power trains selectively establishable in a power transmitting condition, a rotatable body, an axially shiftable power transmitting member constrained for rotation with said body but being shiftable relative thereto selectively between a central neutral position wherein neither of said power trains is established and axially opposite operative positions wherein said trains are respectively established, said shiftable member having a radial bore passing therethrough between its ends and said body having a recess in radial alignment with said bore while said shiftable member is in neutral, a synchronizer clutch element shiftable axially with said axially shiftable member, said element and said member also being relatively axially shiftable, detent means for causing initial axial movement of said clutch element with said axially shiftable member from the neutral position toward either of said operative positions, said detent means comprising a component in the form of a notch in said clutch element in radial registry with the bore of said power transmitting member, a plunger component carried by said member in said bore for movement therein radially of said member and spring means in said recess retractively pressing against said plunger for urging the same into said recess component of the detent means, and cam members on said axially shiftable member at opposite sides of said spring means axially of said member while said member is in the neutral position, and said cam members being operable when said shiftable member is shifted in opposite directions for respectively retracting said spring means and terminating the force exerted thereby on said plunger pursuant to movement of the axially shiftable member from the neutral position.

13. In a power transmitting apparatus comprising a plurality of power trains selectively establishable in a power transmitting condition, a rotatable body, an axially shiftable power transmitting member constrained for rotation with said body but being shiftable relative thereto selectively between a central neutral position wherein neither of said power trains is established and axially opposite operative positions wherein said trains are respectively established, said rotatable power transmitting member having axially spaced rows of circumferentially spaced teeth of which one row is operable when said member is shifted in one direction from the neutral for establishing one power train and of which rows of teeth the other is operable in establishing the other of said power trains when said member is shifted in the opposite direction, said member having a radial bore passing therethrough at a section between said rows of teeth and said body having a recess in radial alignment with said bore while said shiftable member is in neutral, a synchronizer clutch element shiftable axially with said axially shiftable member, said element and said member also being relatively axially shiftable, detent means for causing initial axial movement of said clutch element with said axially shiftable member from the neutral position toward either of said operative positions, said detent means comprising a component in the form of a notch in said clutch element in radial registry with the bore of said power transmitting member, a plunger component carried by said member in said bore for movement therein radially of said member and spring means in said recess retractively pressing against said plunger for urging the same into said recess component of the detent means, and certain teeth in said rows of teeth being aligned with said spring means axially of said shiftable member and being operable when such member is shifted in opposite directions for respectively retracting said spring means and terminating the force exerted thereby on said plunger pursuant to movement of the axially shiftable member from the neutral position.

WILLIAM W. HENNING.

REFERENCES CITED

The following references are of record in the file of this patent:

UNITED STATES PATENTS

| Number | Name | Date |
| --- | --- | --- |
| 1,901,712 | Christman | Mar. 14, 1933 |
| 2,046,957 | Manville | July 7, 1936 |
| 2,087,070 | Reggio | July 13, 1937 |
| 2,248,133 | Snow | July 8, 1941 |
| 2,251,342 | Rauen | Aug. 5, 1941 |
| 2,369,842 | Neracher et al. | Feb. 20, 1945 |

FOREIGN PATENTS

| Number | Country | Date |
| --- | --- | --- |
| 464,102 | Great Britain | Apr. 9, 1937 |